(12) United States Patent
Rautio

(10) Patent No.: US 8,388,843 B2
(45) Date of Patent: Mar. 5, 2013

(54) INTEGRITY TESTABLE MULTILAYERED FILTER DEVICE

(75) Inventor: Kevin Rautio, Manchester-by-the-Sea, MA (US)

(73) Assignee: EMD Millipore Corporation, Billerica, MA (US)

( * ) Notice: Subject to any disclaimer, the term of this patent is extended or adjusted under 35 U.S.C. 154(b) by 0 days.

(21) Appl. No.: 13/197,185

(22) Filed: Aug. 3, 2011

(65) Prior Publication Data
US 2011/0283513 A1    Nov. 24, 2011

Related U.S. Application Data

(62) Division of application No. 11/526,476, filed on Sep. 25, 2006, now Pat. No. 7,998,349.

(60) Provisional application No. 60/725,442, filed on Oct. 11, 2005.

(51) Int. Cl.
*B01D 35/30* (2006.01)
*B01D 27/14* (2006.01)
*B01D 29/58* (2006.01)

(52) U.S. Cl. ........ 210/338; 210/232; 210/256; 210/335; 210/342; 210/485; 210/493.2

(58) Field of Classification Search .................. None
See application file for complete search history.

(56) References Cited

U.S. PATENT DOCUMENTS

| | | | |
|---|---|---|---|
| 4,909,937 A | 3/1990 | Hoffmann et al. | |
| 5,282,380 A | 2/1994 | DiLeo et al. | |
| 5,429,742 A * | 7/1995 | Gutman et al. | 210/321.75 |
| 5,457,986 A | 10/1995 | DiLeo et al. | |
| 5,459,074 A | 10/1995 | Muoni | |
| 5,830,371 A | 11/1998 | Smith et al. | |
| 6,533,941 B2 * | 3/2003 | Butler | 210/681 |
| 2003/0226795 A1 | 12/2003 | Merritt et al. | |
| 2007/0089489 A1 | 4/2007 | Lewnard et al. | |

FOREIGN PATENT DOCUMENTS

| | | |
|---|---|---|
| CN | 2498602 Y | 7/2002 |
| GB | 1203514 A | 8/1970 |
| GB | 2202164 A | 9/1988 |
| JP | 63267409 A | 11/1988 |
| WO | 90/11116 A1 | 10/1990 |
| WO | 02/45819 A2 | 6/2002 |

OTHER PUBLICATIONS

Extended European Search Report received for EP Patent Application No. 06122104.0, mailed on Jan. 23, 2007, 6 pages.

* cited by examiner

*Primary Examiner* — Benjamin Kurtz
(74) *Attorney, Agent, or Firm* — EMD Millipore Corporation

(57) ABSTRACT

The present invention relates to a device having two or more separate filtration layers that can be independently tested for integrity yet which allow for serial filtration through the two or more layers to obtain the desired characteristics such as retention. The device is made of two or more filtration areas, each containing one filter layer. Each area has one filtration layer and a first endcap bonded to a first end of the filter and a second endcap bonded to a second end of the filter. The areas are arranged concentrically around each other such that the first area is inward of the second area which is inward of a third area and the like. Each area is formed separately and integrity tested separately before final assembly. The first area is slid into the inside of the second area and then the two endcaps are either bonded to each, bonded to a third overall endcap or overmolded by a third endcap.

8 Claims, 1 Drawing Sheet

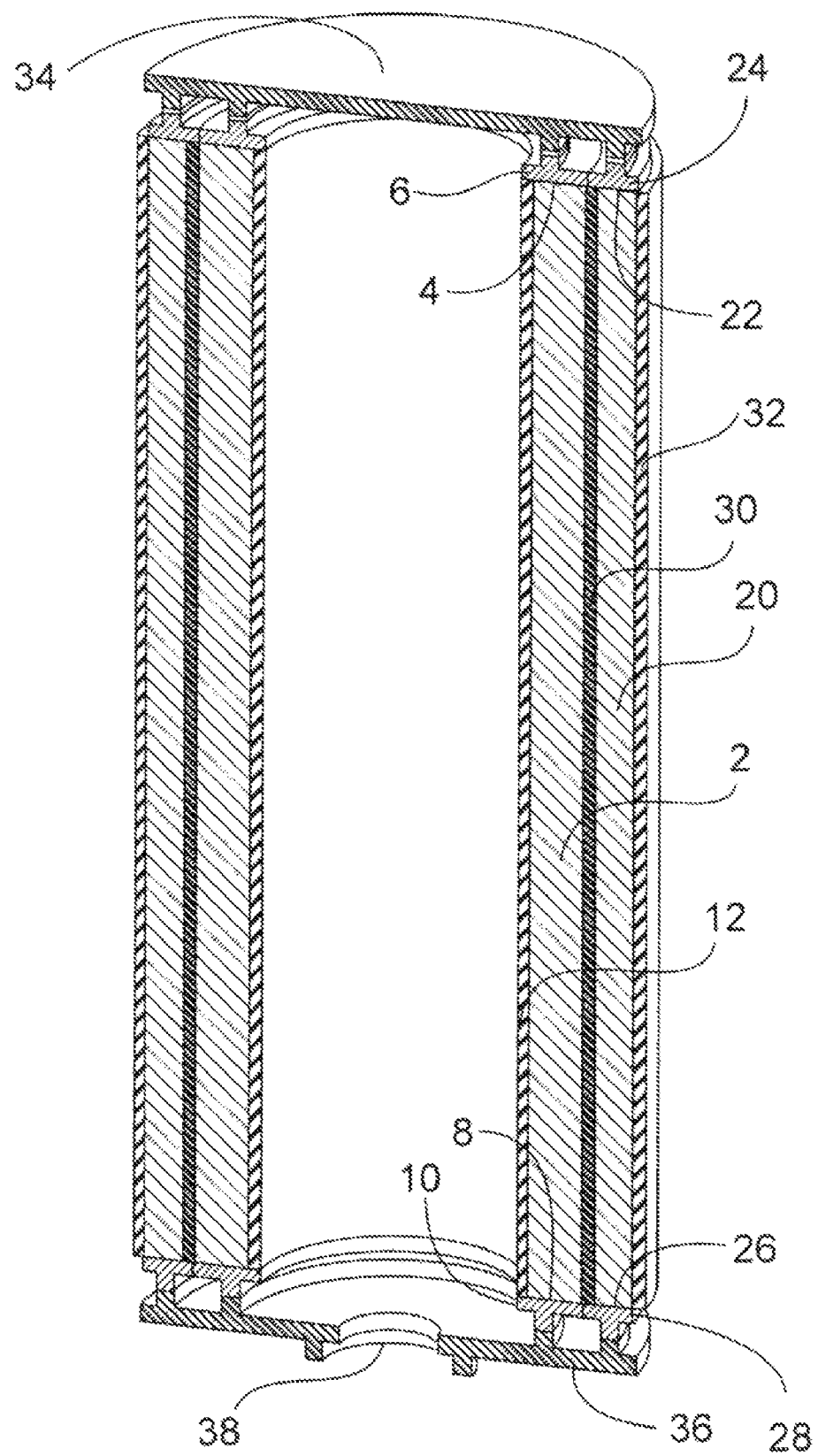

INTEGRITY TESTABLE MULTILAYERED FILTER DEVICE

CROSS REFERENCE RELATED APPLICATIONS

The present utility patent application is a divisional application of U.S. application Ser. No. 11/526,476, filed on Sep. 26, 2001, which claims the benefit of U.S. Provisional Patent Application No. 60/725,442, filed on Oct. 11, 2005. The entire contents of which are incorporated herewith in their entirety.

The present invention relates to a device containing multiple layers of filters or membrane that is capable of being integrity tested. More particularly, it relates to a device containing multiple layers of filters or membrane each of which is capable of being integrity tested individually.

BACKGROUND OF THE INVENTION

Some filter devices contain two or more layers of filter or membrane sandwiched together in order to gain certain performance characteristics such as retention. It is important that each layer remain integral and defect free throughout the assembly process and during its use.

Normally integrity testing is done to the finished product containing the multiple layers through an air diffusion test. This test wets out the filter layers with a suitable liquid, such as water, alcohol or mixtures of the two (depending on whether the filter is hydrophilic or hydrophobic, the fluid used to test for integrity and the like). A gas, gases or liquid at a set pressure(s) is applied to one side of the wetted membrane and its flow on the other side is measured. If the flow increase downstream is too quick or at a low pressure, this indicates that there is a defect in the filter or its sealing into the device. The problem with using this test in devices with multiple layers of membrane is that only the overall device is tested and the test can only indicate if there is a defect in all the layers. A defect in one layer may not provide one with a conclusive indication of a defect especially if the last layer is integral.

What is needed is a device that allows one to independently test each layer of membrane of an integrated multilayered device. The present invention allows one the ability to do so.

SUMMARY OF THE INVENTION

The present invention relates to a device having two or more separate filtration layers that can be independently tested for integrity yet which allow for serial filtration through the two or more layers to obtain the desired characteristics such as retention. The device makes subassemblies of each layer and tests each layer for integrity before it is formed into the final device format.

The device is made of two or more filtration areas, each containing one filter layer. Each area has one filtration layer and a first endcap bonded to a first end of the filter and a second endcap bonded to a second end of the filter. The areas are arranged concentrically around each other such that the first area is inward of the second area which is inward of a third area and the like. Each area is formed separately and integrity tested separately before final assembly. The first area is slid into the inside of the second area and then the two endcaps are either bonded to each, bonded to a third overall endcap or overmolded by a third endcap.

A process for making the device is also disclosed. Here a first filter pack is formed of a filter, preferably pleated to increase surface area, which is preferably cylindrical in form and having its two vertical edges (seam) joined together in a liquid tight arrangement. The first horizontal end of the filter is liquid tightly bonded to a first endcap and the second horizontal end of the filter is liquid tightly bonded to a second endcap. The first pack is then tested for integrity using an integrity test such as an air-water diffusion test by wetting the filter, applying a gas under pressure to one side of the filter, and measuring the flow of air on the other side of the filter. Other non-destructive integrity tests can also be used. Upon successful completion of the integrity test, a second pack is formed the same way as the first pack. This pack has an inner dimension larger than the outer dimension of the first pack so as to form a concentric arrangement of the packs around each other. The second pack is then integrity tested and if it passes, the two packs are finally assembled so that the first pack is inside the second pack which concentrically surrounds the first pack. If desired additionally layers can be formed concentrically around the first two.

These and other embodiments will become obvious to one of ordinary skill in the art from the specification and claims below.

IN THE DRAWINGS

FIG. 1 shows a first embodiment of the present invention.

DETAILED DESCRIPTION OF THE INVENTION

The present invention relates to a multilayered filter device wherein each layer is formed separate from the other layers in a subassembly, each having a first and second endcap. A central porous core and an outlet are also used. Each layer is then integrity tested and if they pass, they are assembled concentrically around each other and are sealed to each to form a liquid tight device. Preferably, an outer porous housing is sealed outside the last filter layer and any fluid entering the housing must flow through each filter layer and then the core before exiting the outlet.

FIG. 1 shows a first embodiment of the present invention with two layers. More than two layers can be made by the present invention as well. The first filter layer 2 is sealed along its vertical edges (not shown) preferably by a seam (not shown) as is well-known in the art. The top horizontal surface 4 of the filter layer 2 is sealed to a first end cap 6 such as by polymer adhesion, solvent bonding or adhesives. Likewise the bottom horizontal surface 8 of the filter layer 2 is sealed to a second end cap 10 such as by polymer adhesion, solvent bonding or adhesives. A porous core 12 forms the inner surface of the first filter layer in this embodiment although the core may be a separate piece or may be part of another piece such as the outlet end cap (described below) if desired.

As shown the first filter layer 2 is preferably cylindrical in shape, although other cross-sectional shapes such as oval, triangular or polygonal can be used. Preferably the first filter layer 2 is pleated to increase the available surface area.

Arranged concentrically outside around the first filter layer 2 is a second filter layer 20. The second layer 20 is preferably cylindrical in shape although other cross-sectional shapes such as oval, triangular or polygonal can be used and it preferably has the same shape as the first filter layer 2. Preferably the second filter layer 20 is pleated to increase the available surface area. The second filter layer 20 is sealed along its vertical edges (not shown) preferably by a seam (not shown) as is well-known in the art. The top horizontal surface 22 of the second filter layer 20 is sealed to a first end cap 24 such as by polymer adhesion, solvent bonding or adhesives. Likewise the bottom horizontal surface 26 of the second filter layer 20 is sealed to a second end cap 28 such as by polymer adhesion, solvent bonding or adhesives. Preferably a porous spacer layer 30 is placed adjacent the inner surface of the second filter layer 20 and sealed to the top and bottom end caps 24 and 28.

As shown, the inner edges of the first and second end caps 6, 10 of the first filter layer 2 are liquid tightly sealed to the respective outer surfaces of the core 12. The inner edges of the first and second endcaps 24, 28 of the second filter layer 20 are liquid tightly sealed to the respective outer surfaces of the first and second end caps 6, 10 of the first filter layer 2. Arranged concentrically outward and around the second filter layer 20 is a porous cartridge housing 32 that is liquid tightly sealed to the outer edges of the endcaps 24, 28 of the second filter layer 20. A top closed cartridge end cap 34 is sealed to the housing 32, and top end caps 6, 24 of the first and second filter layers 2, 20. A bottom cartridge end cap 36 having an outlet 38 is sealed to the housing 32 and the bottom end caps 10 and 28 of the first and second filter layers 2, 20 to complete the cartridge.

In this manner, liquid which enters the housing 32 must flow through the second 20 and then the first filter layer 2 before entering the core 12 and leaving the filter through the outlet 38.

As mentioned above, the present invention may have more than two layers with each layer being assembled and arranged concentrically outward of the last. Once the outer most filter layer has been formed and sealed the porous outer housing and top and bottom cartridge end caps are applied.

A method of making the present device is to form the first layer as a subassembly comprised of at least the filter material and the top and bottom end caps. If desired, the core may be included as the inner wall of the subassembly or it may be a separate piece or incorporated as part of the bottom cartridge endcap. The second, and if desired, additional layers, are then likewise formed as subassemblies of filter and at least top and bottom end caps. Preferably each additional subassembly has a porous spacer or support layer as its inner wall.

The inner diameter of an outer layer is substantially the same diameter (although it may be slightly smaller depending upon the sealing method used (discussed below) as the outer diameter of the layer inward of it or of the core when referring to the first filter layer. At best there should be a slight interference fit between the adjacent layers as they are assembled together. In this manner, there is a close fit between the subassemblies so that they can be sealed together in a liquid tight manner.

As each layer can be independently tested for integrity, one can use any conventional test such as the air/water diffusion test in which the membrane is wet and a gas is applied to one side of the membrane at a set pressure or range of pressures. The flow of the gas is measured on the other side of the membrane to determine whether the layer is integral or if it has a defect such as a pin hole or a defective seal.

Alternatively, one can use a more sophisticated and sensitive test such as a binary gas test as claimed in a co-pending application filed this day entitled "Methods and Systems for Integrity testing of Porous Materials" by John Lewnard. In this test, the selected filter layer is wetted with a liquid that is suitable for the binary gases used. For example one can use water, alcohol, mixes of water and alcohol and the like depending upon the gases selected. Two gases are chosen such that one has a high solubility in the liquid of choice and the other has a lower solubility in that same liquid. Selected gases include but are not limited to carbon dioxide, Freon, sulfur hexafluoride or other perfluoro gases, noble gases and the like. The binary gas mixture is introduced as described in FIGS. 2A-C in a predetermined amount relative to each other and the amount of one or both of the gases is measured by the detection device such as a gas chromatograph or a mass spectrometer on the downstream side of the filter layer to determine whether there is a shift in the relative amount of each gas in the detected gas stream. Where the measured amount of gas differs from the predetermined amount of gas initially added to the system, a defect is detected. If no difference in concentration is found, the layer is determined to be integral. Integral, when referring herein to a porous material, means non-defective. The predetermined amount may be, for example, the amount of gas calculated to diffuse through the integral, wetted porous material at a given temperature and pressure. The given temperature and pressure may be the temperature and pressure under which the test is conducted.

Another method of testing integrity is to use a liquid-liquid porometry test as shown in U.S. Pat. Nos. 5,282,380 and 5,457,986 (DiLeo) which may also be used in the present invention.

The method used for testing integrity is not critical to the invention. Any method that provides one with a suitable value of integrity and which is not destructive to the device can be used.

Once all the layers have been made and successfully tested, they can be assembled. The easiest method is to simply slide the first layer into the hollow center of the second layer, slide the combined first and second layer into the third layer, etc. Each pair of layers can be sealed to each other before continuing to add any other layers if used or they can all be sealed at once. A variety of methods are known for sealing plastics to each other and include but are not limited to adhesives, solvent bonding, heat or ultrasonic bonding and the like.

After all the layers have been assembled and sealed to each other, the top and bottom endcaps are all sealed to a respective cartridge endcap and the outer housing to complete the assembly.

Alternatively, one can slide the subassemblies together, slide an outer housing over the outermost layer and then place the entire assembly into a mold and injection mold or overmold the cartridge endcaps over the endcaps of the layers and the housing to create a liquid tight sealing arrangement.

The device and methods of the present invention can be used with any filter media of any size that is capable of being integrity tested using gases or liquids. They may be for example woven or non-woven filters or cast porous membranes. The filter media may be a microporous, ultrafiltration (UF), nanofiltration or reverse osmosis membrane formed of a polymer selected from olefins such as polyethylene including ultrahigh molecular weight polyethylene, polypropylene, EVA copolymers and alpha olefins, metallocene olefinic polymers, PFA, MFA, PTFE, polycarbonate, vinyl copolymers such as PVC, polyamides such as nylon, polyesters, cellulose, cellulose acetate, regenerated cellulose, cellulose composites, polysulphone, polyethersulphone, polyarylsulphone, polyphenylsulphone, polyacrylonitrile, polyvinylidene fluoride (PVDF), and blends thereof. The membrane selected depends upon the application, desired filtration characteristics, particle type and size to be filtered and the flow desired.

The other filter components such as end caps, inlets, outlets, housings, cores, ports, valves, etc., can be made of a variety of materials, such as metal, ceramic, glass or plastic. Preferably, the components are formed of plastics, more preferably thermoplastics, such as polyolefins, especially polyethylene and polypropylene, homopolymers or copolymers thereof, ethylene vinyl acetate (EVA) copolymers; polycarbonates; styrenes; PTFE resin; thermoplastic perfluorinated polymers such PFA; nylons and other polyamides; PET and blends of any of the above.

What is claimed:

1. A method of forming a serial filtration device having opposing open and closed ends, including two or more concentric cylindrical filter layers wherein each filter layer is capable of being independently integrity tested before being assembled into the filtration device, comprising the steps of:
   a. forming a first filter layer having first and second vertical edges by bonding said edges together in a liquid tight arrangement;
   b. bonding a first endcap, having inner and outer edges, to a first horizontal end of the first filter layer;
   c. bonding a second endcap, having inner and outer edges, to a second horizontal-end of the first filter layer;
   d. testing the integrity of the first filter layer formed in steps (a) to (c);
   e. forming a second filter layer having third and fourth vertical edges by bonding said edges together in a liquid tight arrangement;
   f. bonding a third endcap, having inner and outer edges, to a third horizontal end of the second filter layer;
   g. bonding a fourth endcap, having inner and outer edges, to a fourth horizontal end of the second filter layer;
   h. testing the integrity of the second layer formed in steps (c) to (g);
   i. arranging the first filter layer concentrically around a porous core;
   j. arranging a porous spacer layer concentrically around the first filter layer;
   k. arranging the second filter layer concentrically around the porous spacer layer;
   l. bonding the outer edges of the first endcap to the inner edges of the third endcap;
   m. bonding the outer edges of the second endcap to the inner edges of the fourth endcap;
   n. binding the porous spacer layer to the third and fourth endcaps of the second filter layer;
   o. arranging a cylindrical porous outermost housing arranged concentrically around the outer periphery of the second filter layer; and
   p. bonding the housing to the third, and fourth endcaps; wherein the core, first filter layer, porous spacer layer second filter layer and outermost housing being bonded together selected from the group consisting of solvent bonding, adhesive bonding, heat bonding and ultrasonic bonding, in a liquid tight manner such that all liquid entering the second filter layer must flow through the first filter layer before reaching the core and then the outlet.

2. The method according to claim 1, wherein the first and second filter layers are both pleated.

3. The method according to claim 1, wherein the first filter layer is a material selected from the group consisting of a woven filter, a non-woven filter or a cast porous membrane.

4. The method according to claim 1, wherein the first filter layer is selected from the group consisting of a microporous filter, ultrafiltration filter, nanofiltration filter, or reverse osmosis membrane.

5. The method according to claim 4, wherein the first filter layer is a polymer material selected from the group consisting of polyolefins, polyethylene, ultrahigh molecular weight polyethylene, polypropylene, ethylene vinyl acetate copolymers, alpha olefins, metallocene olefinic polymers, PFA, MFA, PTFE, polycarbonate, vinyl copolymers, PVC, polyamides, nylon, polyesters, cellulose, cellulose acetate, regenerated cellulose, cellulose composites, polysulphone, polyethersulphone, polyarylsulphone, polyphenylsulphone, polyacrylonitrile, polyvinylidene fluoride, and blends thereof.

6. The method according to claim 1, wherein the second filter layer is a material selected from the group consisting of a woven filter, a non-woven filter or a cast porous membrane.

7. The method according to claim 1, wherein the second filter layer is selected from the group consisting of a microporous filter, ultrafiltration filter, nanofiltration filter, or reverse osmosis membrane.

8. The method according to claim 7, wherein the second filter layer is a polymer material selected from the group consisting of polyolefins, polyethylene, ultrahigh molecular weight polyethylene, polypropylene, ethylene vinyl acetate copolymers, alpha olefins, metallocene olefinic polymers, PFA, MFA, PTFE, polycarbonate, vinyl copolymers, PVC, polyamides, nylon, polyesters, cellulose, cellulose acetate, regenerated cellulose, cellulose composites, polysulphone, polyethersulphone, polyarylsulphone, polyphenylsulphone, polyacrylonitrile, polyvinylidene fluoride, and blends thereof.

* * * * *

UNITED STATES PATENT AND TRADEMARK OFFICE
CERTIFICATE OF CORRECTION

| | | |
|---|---|---|
| PATENT NO. | : 8,388,843 B2 | Page 1 of 1 |
| APPLICATION NO. | : 13/197185 | |
| DATED | : March 5, 2013 | |
| INVENTOR(S) | : Kevin Rautio | |

It is certified that error appears in the above-identified patent and that said Letters Patent is hereby corrected as shown below:

Title Page, Item (62) Related Application Data, delete "26, 2001," and insert -- 25, 2006, --, therefor.

In the Claims

In Claim 1, delete "horizontal-end" and insert -- horizontal end --, therefor.

In Claim 1, delete "(c)" and insert -- (e) --, therefor.

Signed and Sealed this
Twenty-fifth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,388,843 B2  
APPLICATION NO. : 13/197185  
DATED : March 5, 2013  
INVENTOR(S) : Kevin Rautio Page 1 of 1

It is certified that error appears in the above-identified patent and that said Letters Patent is hereby corrected as shown below:

Title Page, Item (62) Related Application Data, delete "26, 2001," and insert -- 25, 2006, --, therefor.

In the Claims

Column 5, line 16 (Claim 1, line 12) delete "horizontal-end" and insert -- horizontal end --, therefor.

Column 5, line 27 (Claim 1, line 23) delete "(c)" and insert -- (e) --, therefor.

This certificate supersedes the Certificate of Correction issued June 25, 2013.

Signed and Sealed this  
Twenty-third Day of July, 2013

Teresa Stanek Rea  
*Acting Director of the United States Patent and Trademark Office*